United States Patent
Maas et al.

(10) Patent No.: US 10,500,885 B2
(45) Date of Patent: Dec. 10, 2019

(54) METHOD FOR PRINTING TO A RECORDING MEDIUM WITH A FLUID-BASED COLORANT TRANSPORT OR PIGMENT TRANSPORT AND A SURFACE PROTECTION IN FLUID-BASED PRINTING TO INCREASE THE PRESENTABLE COLOR SPACE

(71) Applicant: Océ Holding B.V., Venlo (NL)

(72) Inventors: Jens Maas, Munich (DE); Johann Schwarzmueller, Munich (DE)

(73) Assignee: Océ Holding B.V., Venlo (NL)

( * ) Notice: Subject to any disclaimer, the term of this patent is extended or adjusted under 35 U.S.C. 154(b) by 0 days.

(21) Appl. No.: 15/946,253

(22) Filed: Apr. 5, 2018

(65) Prior Publication Data
US 2018/0290477 A1 Oct. 11, 2018

(30) Foreign Application Priority Data
Apr. 5, 2017 (DE) .......................... 10 2017 107312

(51) Int. Cl.
*B41M 7/00* (2006.01)
*C09D 5/00* (2006.01)
*C09D 5/02* (2006.01)

(52) U.S. Cl.
CPC .......... *B41M 7/0054* (2013.01); *B41M 7/009* (2013.01); *B41M 7/0045* (2013.01); *C09D 5/00* (2013.01); *C09D 5/022* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00;
(Continued)

(56) References Cited

U.S. PATENT DOCUMENTS 8,517,528 B2 * 8/2013 Sano .................. B41J 3/407
347/100
9,193,153 B2 11/2015 Kuehnberger et al.
(Continued)

FOREIGN PATENT DOCUMENTS

DE 102008010738 A1 6/2009
DE 102009044802 A1 12/2011
DE 102012006371 A1 7/2012

OTHER PUBLICATIONS

German action dated Jan. 22, 2018 for application 10 2017 107 312.4.

*Primary Examiner* — Manish S Shah
(74) *Attorney, Agent, or Firm* — Schiff Hardin LLP

(57) ABSTRACT

In a method for printing to a recording medium using a fluid-based colorant transport or pigment transport (e.g. via ink or liquid toner), fluid-based printing to the recording medium is performed and a surface protection is applied to increase the robustness (e.g. abrasion resistance) in at least a printed region of the recording medium. The applied quantity per area is configured to provide an increased color space. Further, in a surface protection given fluid-based printing to a recording medium, the presentable color space is increased.

14 Claims, 4 Drawing Sheets

(58) Field of Classification Search
CPC .... B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | | |
|---|---|---|---|
| 9,266,353 B2 | 2/2016 | Beier et al. | |
| 2004/0189772 A1* | 9/2004 | Arai | B41J 3/543 |
| | | | 347/102 |
| 2005/0190248 A1* | 9/2005 | Konno | B41J 2/155 |
| | | | 347/102 |
| 2007/0282037 A1* | 12/2007 | Anderson | B41M 7/02 |
| | | | 524/31 |
| 2008/0248196 A1* | 10/2008 | Anderson | B41M 7/0045 |
| | | | 427/203 |
| 2009/0085996 A1 | 4/2009 | Kasai | |
| 2009/0262159 A1 | 10/2009 | Lang | |
| 2013/0222497 A1* | 8/2013 | Nakano | B41J 11/002 |
| | | | 347/100 |

* cited by examiner

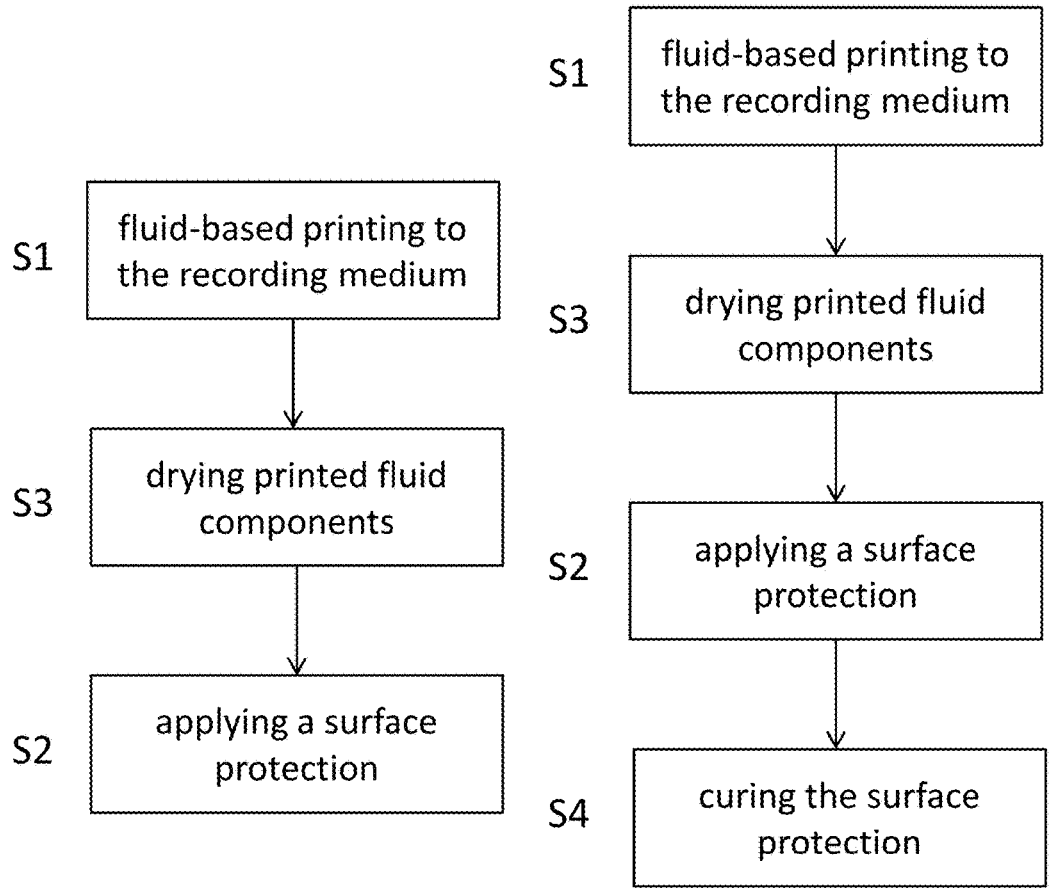
Fig. 3                    Fig. 4

METHOD FOR PRINTING TO A RECORDING MEDIUM WITH A FLUID-BASED COLORANT TRANSPORT OR PIGMENT TRANSPORT AND A SURFACE PROTECTION IN FLUID-BASED PRINTING TO INCREASE THE PRESENTABLE COLOR SPACE

CROSS REFERENCE TO RELATED APPLICATIONS

This patent application claims priority to German Patent Application No. 102017107312.4, filed Apr. 5, 2017, which is incorporated herein by reference in its entirety.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 3 is a flowchart of a method for printing to a recording medium according to an exemplary embodiment of the present disclosure;

FIG. 4 is a flowchart of a method for printing to a recording medium according to an exemplary embodiment of the present disclosure;

Figure 1:
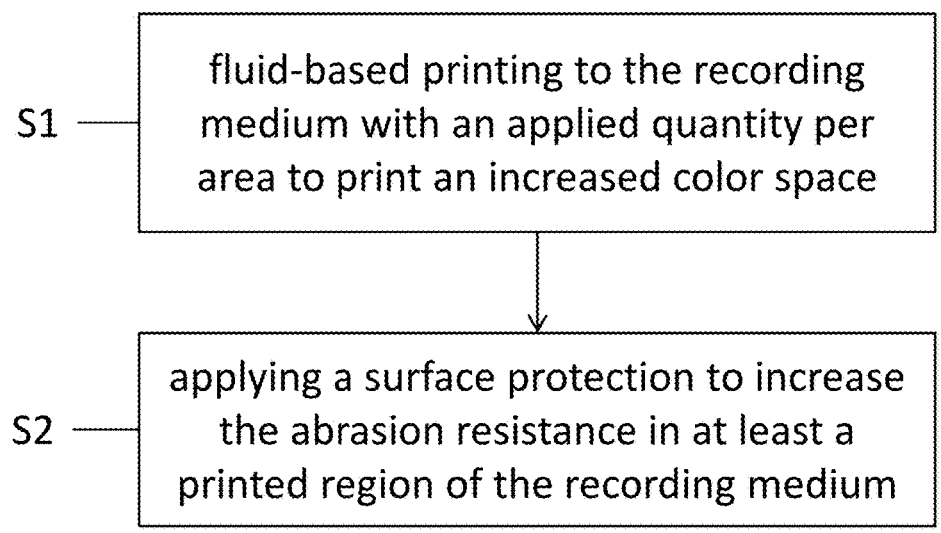
FIG. 1 is a flowchart of a method for printing to a recording medium according to an exemplary embodiment of the present disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The present disclosure relates to a method for printing to a recording medium using a fluid-based colorant transport or pigment transport, in particular via ink or liquid toner; a use of a surface protection in fluid-based printing to a recording medium to increase the presentable color space; and a correspondingly printed recording medium.

Although the present disclosure is explained in detail in the following in relation to inkjet printing, it is not limited and is transferrable to other fluid-based printing methods, such as other types of ink or liquid toner printing, in particular ink bubble (e.g. bubble jet) printing, digital printing or the like.

The most varied measures exist for quality improvement in inkjet printing. What is known as the color space represents an important quality criterion.

The color space encompasses all possible colors that are presentable within a color model. Within the color model, the presentable colors form a "body" designated as a color space, also referred to as a gamut. In the ideal case, the color space may fill the entire color model. In reality, however, the realization of the color presentation is always afflicted by losses. A color space therefore serves to describe differences between an ideal state and a real state of the color presentation, wherein a larger color space is closer to the ideal state than a smaller color space.

In printing to a recording medium, the color space is defined by the applied quantity of colorants or color pigments per area. Stated more simply, the more color pigments that may be applied to the substrate of a recording medium per area, the larger the presentable color space.

In inkjet printing, the presentable color space is limited in that the colorants or pigments are dispersed in the fluid and are sprayed onto the recording medium via nozzles of a print head of the printer. The quantity of colorants or pigments in the dispersion is limited by the processing capability in the print head, and therefore for the most part cannot be significantly increased. In order to increase the quantity of colorants/pigments on the substrate of a recording medium, an increase in the applied fluid quantity or ink quantity per area is therefore required.

The absolute applied quantity of ink, which is also referred to as TIC (Total Ink Coverage), is measured in volume per area. However, the value of a maximum absolute applied quantity is strongly dependent on the substrate used, the ink used, and the additional process parameters, such that in practice this value is less suitable for a comparable description of a maximum allowable applied quantity.

The relative applied quantity per area (distinctly more relevant in practice), which is also referred to as a TAC (Total Area Coverage), is typically indicated in %. 100% TAC thereby corresponds to a completely covering application of a single color. In the printing industry, it is thereby a typical term which describes the applied tonal value sum. The TAC sum is thus comparable to what is known as the TWS or TVS (Tonal Value Sum), for example as it is used in the ISO 12467-2 standard.

A maximum allowable relative areal coverage likewise depends on the substrate, wherein naturally all printing parameters for the application of the ink are adapted to the substrate. Typical maximum allowable areal coverages, for example for newspaper, are in the range from 190 to 200%.

Given papers optimized or accordingly coated for inkjet printing, maximum allowable areal coverages of up to 280% are even possible. Given a standard paper for printing needs, a maximum allowable areal coverage is normally between 200% and 240%.

Technical reasons for the maximum allowable applied quantity are numerous. In particular, the limited robustness of the substrate of a recording medium with regard to the drying parameters for drying the ink represents a constraint. A high applied quantity requires a higher drying temperature and/or greater drying time in order to achieve the degree of drying of the ink that is required for further processing in a printing system. However, by increasing the drying temperature, in particular temperature differences from printed to unprinted substrate may lead to negative effects such as formation of ridges or folds, blisters, disturbed web travel, slippage etc. In order to avoid these effects, the drying temperature must therefore be limited.

Given an applied quantity of ink per area as is necessary for an increased color space, which applied quantity per area is in particular above the maximum allowable relative areal coverage, the limitation of the drying temperature thus leads to an incomplete drying of the ink and to a reduction of the fastness or abrasion resistance of the ink. An applied print image may thus be damaged via abrasion, sticking effects, or the like. in further processing by the printing system, for example upon rolling and belting in the transport of the recording medium or upon stacking, rolling up or handling of the same.

An additional constraint lies in the limited absorption capability of the substrate of a recording medium. A high absorption capability enables what is known as a good penetration behavior, meaning a fast intake of fluid components of the ink (for example solvent) into the substrate so that less fluid needs to be evaporated in the drying.

The number of applied colors and the composition of the inks that are used also represent additional influencing factors. In particular, interactions between the applied colors or inks may influence the drying behavior. The ratio between individual components of an ink, for example between water, solvents, solids and additional components, also influences the drying behavior.

Overall, the maximum technically possible applied quantity of ink per area—for example 400% TAC given a four-color system—thus cannot be applied in inkjet printing. That limits the possible applied quantity of colorants or color pigments per area, and thus also the possible presentable color space.

The problem of the limited color space in inkjet printing has previously been countered by increasing the number of individual colors of a printing system. For example, it is a known method to expand four-color printing systems—what are known as CMYK systems having the primary colors Cyan, Magenta, Yellow, Black (Key)—with additional colors. Expansions with what is known as RGB (Red, Green, Blue) or OVG (Orange, Violet, Green) may be provided for this. An individual color may thus be printed as an individual color, for example a green color given a printing system extended by OVG, without needing to mix it from other colors (from cyan and yellow given green).

However, since the allowable maximum areal coverage is not increased, nevertheless the applied quantities of the individual colors often need to be reduced given such measures, which in turn means a limitation of the color space. Moreover, high additional costs arise due to the additional colors since, in inkjet printing, an additional print bar including auxiliary units is required which in particular contains especially cost-intensive parts of an inkjet printing system. Moreover, a high additional expense is necessary for the data preparation and a change to the process workflow of the printing system. Overall, a high additional expense results for acquisition, installation, service and operation.

The present disclosure is directed to an improved method for printing to a recording medium by means of fluid-based colorant transport or pigment transport with increased color space.

The disclosure relates to a method for printing to a recording medium using fluid-based colorant transport or pigment transport, in particular via ink or liquid toner, having the following steps: fluid-based printing to the recording medium, wherein an applied quantity per area that is provided for an increased color space is printed, and application of a surface protection to increase the abrasion resistance, at least in a printed region of the recording medium.

The disclosure also relates to a use of a surface protection in fluid-based printing to a recording medium, in particular according to a method according to the disclosure, to increase the presentable color space, wherein the surface protection to increase the abrasion resistance is provided given an applied quantity per area that is printed for an increased color space.

The disclosure additionally relates to an recording medium that is printed to, having a substrate; a fluid-based color layer or pigment layer printed onto the substrate in an applied quantity per area that is provided for an increased color space; and a surface protection that is applied at least onto the colorant layer or pigment layer to increase the abrasion resistance.

Exemplary embodiments of the present disclosure increase the color space that can be presented given fluid-based printing, including ink printing (e.g. inkjet printing) or liquid toner printing, via a surface protection that increases the robustness of the print, said surface protection in particular being in the form of a transparent coating. In an exemplary embodiment, the increased robustness of the print is an increased abrasion resistance of the print.

In this way, it is enabled to apply a greater quantity of fluid, and therefore a greater applied quantity per area, of the colorants or pigments onto the substrate of the recording medium without altering the drying parameters or needing to accept disadvantages in the processing capability. In particular, double-digit percentile increases in the maximum allowable TAC value are thus possible according to the disclosure, for example by more than 20% TAC. The disadvantages of an increased applied quantity that otherwise occur, in particular the reduced or slowed processing capability, are thus avoided, and the desired increase in the color space is nevertheless achieved.

Given an optimization of the printing and substrate parameters, TAC values of greater than 300%, in particular from 300% to 400%, are even possible by means of inkjet printing with the method according to the disclosure.

According to the disclosure, in this way a surface protection given fluid-based printing to a recording medium is used to increase the presentable color space. The surface protection thereby serves to increase the abrasion resistance given an applied quantity per area that is printed for an increased color space, which applied quantity per area normally has a relatively low degree of drying after the printing process. A damage or unwanted alteration of the print image due to insufficient robustness, for example upon rolling and belting in transport of the recording medium or upon stacking, rolling up or handling of the same, is avoided according to the disclosure in spite of an incomplete drying.

The coating may be applied onto the printed substrate of the recording medium immediately after the printing process, normally after a pre-drying of the fluid components, for example of an ink or of a liquid toner. A recording medium printed to in this way may advantageously be processed further in a typical manner in a printing system, in particular with typical drying speed. In particular, as a result of a reduced degree of drying, for example of an incompletely dried ink, in spite of a reduced robustness (e.g. abrasion resistance) of the print the recording medium may also, due to the surface protection, be directed via rollers, a turner or the like, even on the printed side, without the print having increased color space being damaged.

The embodiments and developments of the present disclosure may be combined with one another as would be understood by one of ordinary skill given the teaching herein. In particular, all features of the method for printing to a recording medium by means of fluid-based color transport or pigment transport are transferrable to a correspondingly printed recording medium and/or to a use of a surface protection given fluid-based printing to a recording medium to increase the presentable color space, and vice versa.

FIG. 1 shows a flowchart of a method for printing to a recording medium according to an exemplary embodiment.

The method serves for printing to a recording medium 1 by means of a fluid-based color transport or pigment transport. It includes a step of the fluid-based printing S1 to the recording medium 1, wherein an applied quantity per area that is provided for an increased color space is printed. In particular, the printing involves an inkjet printing method. However, other printing methods are also conceivable which use ink or liquid toner.

An increased relative applied quantity per area, in particular relative to an otherwise maximum allowable relative applied quantity per area, is preferably provided to show the increased color space. For example, an increase relative to an otherwise maximum allowable relative applied quantity per area is a double-digit TAC percentage, meaning an increase by more than 10% TAC, in particular by more than 20% TAC.

The method also concerns a step of the application S2 of a surface protection 3 to increase the robustness in at least a printed region 4 of the recording medium 1.

The coating may be applied with the most varied system technology and the most varied application methods. For example, it may involve an additional print head row or an additional print bar which applies the coating in inkjet printing. An additional possibility is a spraying application, for example via spray nozzles. Moreover, a roller application via (classical) application rollers and/or a raster roller system (what are known as flexo-coating units), a scoop roller system or the like are conceivable.

The surface protection 3 is preferably provided as a transparent coating and is in particular applied onto the printed substrate of the recording medium immediately after the printing process and/or a pre-drying.

Figure 2:
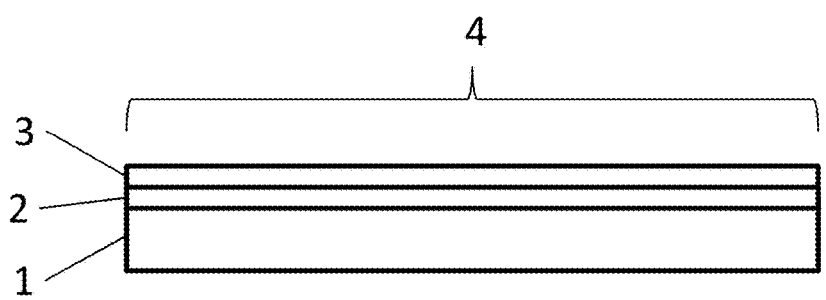
FIG. 2 is a schematic depiction of a printed recording medium according to an exemplary embodiment of the present disclosure.

FIG. 2 shows a schematic depiction of an exemplary embodiment of a printed recording medium 1.

A printed recording medium 1 has a substrate 10; a colorant layer or pigment layer 2 printed onto the substrate 10 in an applied quantity per area that is provided for an increased color space; and a transparent surface protection 3 applied onto the colorant layer or pigment layer 2 to increase the abrasion resistance.

The printed recording medium 1 is preferably produced according to a method according to FIG. 1. It thus involves a use of a surface protection 3 given fluid-based printing to a recording medium 1 to increase the presentable color space. The surface protection 3 is thereby provided to increase the robustness given the applied quantity per area that is printed for an increased color space.

FIG. 3 shows a flowchart of an exemplary embodiment of a method for printing to a recording medium 1.

This exemplary embodiment is based on the exemplary embodiment according to FIG. 1. In contrast to this, however, according to this exemplary embodiment a drying step S3 is provided after the printing S1 and before the application S2 of the surface protection 3, which drying step S3 includes at least a pre-drying of printed fluid components 5, for example of solvents and/or water fractions of an ink. In this way, the surface protection 3 may advantageously be applied without an unwanted reaction or mixing with fluid components 5.

According to one embodiment, the printed applied quantity per area is thereby increased in relation to the parameters of the drying S3 such that the fluid components 5 are incompletely dried upon the application of the surface protection 3. The parameters of the drying S3 thereby in particular correspond to a conventional printing method without surface protection in which a smaller, in particular otherwise maximum allowable (without surface protection) applied quantity per area is printed. Accordingly, according to the disclosure the applied quantity is increased relative to a conventional printing method in order to enable in this way a higher colorant or pigment density, and thus a greater color space. In this instance, in spite of a lower degree of drying the surface protection allows a further processing of the recording medium in the printing system without damage.

As an example, in the printing S1 an ink is printed and, as a result of the increased applied quantity per area, is incompletely dried in the drying S2. Although the incomplete drying leads to a reduced robustness of the ink, it is undamaged due to the applied surface protection 3. The drying S2, and therefore the entire printing process, may thus be advantageously performed with the same process parameters, in particular an identical process speed or feed velocity, as in a conventional ink printing, in particular inkjet printing, and nevertheless an increased color space may be achieved.

According to an embodiment of a method depicted in FIG. 1 or FIG. 3, the surface protection 3 is applied continuously over the printed region 4. This means that a continuous or complete, preferably transparent coating is applied at least in the printed region 4. In particular, a coating is applied across the entire surface of the recording medium 1, as depicted in the exemplary embodiment according to FIG. 5.

In a further embodiment, the surface protection 3 may also be applied in droplet form and/or only partially in the printed regions, meaning in particular not in unprinted regions. In this way, consumable costs may be reduced. For example, this is depicted with the droplets 7 in FIG. 10.

In particular, the surface protection is applied inline, thus during the printing process. For example, in inkjet printing an application may be provided immediately after the ink application, and a pre-drying of the ink may possibly be provided. A large selection of suitable application systems or application types and coating materials is available for this, for example as described above in regards to FIG. 1 and explained in detail below in regards to the additional exemplary embodiments.

According to one embodiment, the surface protection 3 is provided as a sealed layer 8 so that printed fluid components 5, in particular solvents, remain on or in a substrate 10 of the recording medium 1. For example, solvents present in the ink or in the substrate 10 of the recording medium remain upon application of an ink 2; see FIG. 5 in this regard as an example.

Figure 8:
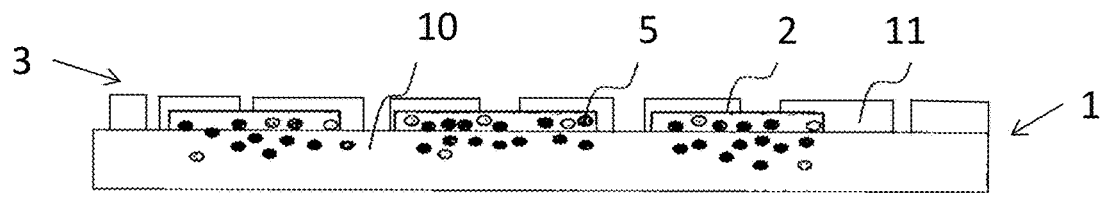
FIG. 8 is a schematic depiction of a printed recording medium according to FIG. 5.

According to a further embodiment, the surface protection 3 is provided as a porous layer 11 so that present fluid components 5 printed in the application S2 may migrate through the layer 11 and/or humidity may penetrate through the layer 11 into the ink 2. This is depicted in FIG. 8 as an example.

Figure 6:
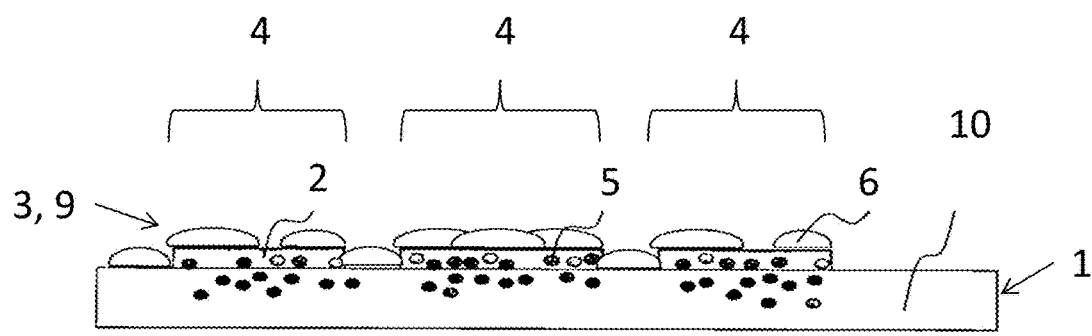
FIG. 6 is a schematic depiction of a printed recording medium according an exemplary embodiment of the present disclosure.
Figure 7:
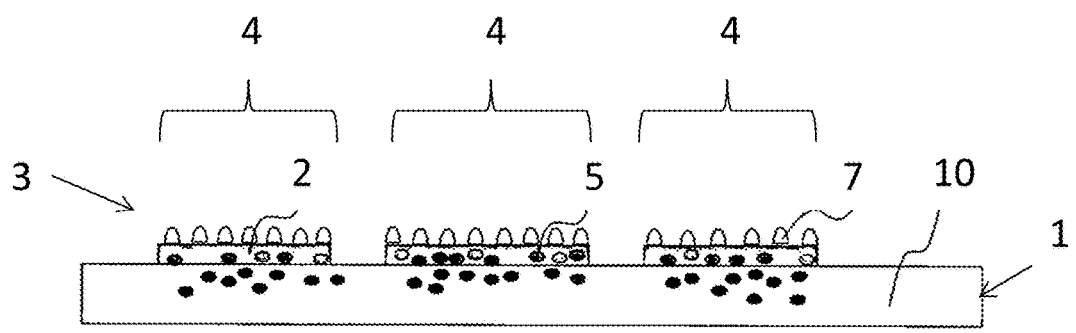
FIG. 7 is a schematic depiction of a printed recording medium according to an exemplary embodiment of the present disclosure.

According to a further embodiment, the surface protection 3 is applied discontinuously; see FIG. 6 or 7 in this regard. The discontinuous application is in particular a coating applied in the form of individual droplets; see droplets 6 in FIG. 6 or droplets 7 in FIG. 7.

FIG. 4 shows a flowchart of an exemplary embodiment of a method for printing to a recording medium 1.

It is thereby a development of the method according to FIG. 3, which following the application S2 contains an additional step of curing S4 in which the surface protection 3 is cured directly after the application. The surface protection 3 is thus a material applied in a fluid state in step S2 which is subsequently cured. Such a cured surface protection 3 is respectively depicted in FIGS. 5, 7, 8 and 10, for example.

As an alternative to the depicted embodiment of the method according to FIG. 4, the step S4 of the curing may also be similarly provided in the method according to FIG. 1, following the application S2.

The curing may take place differently depending on the material selection for the surface protection 3. In one embodiment, the surface protection 3 is applied as a varnish. The curing S4 accordingly involves a curing of the varnish. For example, a UV-curable varnish may be provided, and accordingly a curing via UV radiation. Moreover, an IR-curable varnish and a curing via IR radiation are also conceivable. The use of other or additional varnishes, for example a dispersion varnish and/or a latex-based varnish, is also conceivable. Such a varnish may advantageously be provided independently of the fluid-based printing method that is used and the specifically used fluid, for example independently of the composition of an ink. Furthermore, the varnish is also usable largely independently of the substrate of the recording medium, and normally adheres strongly so that a strong connection is established between substrate and surface protection. In this way, a higher grade of robustness can be achieved which enables a greater applied quantity of ink, and thus a greater color space.

Moreover, due to the type of the varnish, different adjustments may be made to a degree of gloss and an impression of the surface of the recording medium 1, independently of the substrate 10 of the recording medium 1 and the printing method, or of the fluid used for this.

In a further embodiment, the surface protection 3 is applied as a low-friction layer 9, in particular containing silicone, wax or latex, for example in the form of an emulsion containing silicone, wax or latex, to reduce a coefficient of surface friction of the printed recording medium 1. In particular, it is a discontinuous low-friction layer 9 which is formed by a plurality of droplets 6 of the emulsion, as depicted in FIG. 6. Particles of the layer provide a boundary layer against elements that cause wear, said boundary layer reducing the coefficient of friction. A lower coefficient of friction that is provided in this way by the surface protection leads to a reduction in the abrasion at the surface of the printed good or of the printed recording medium, and thus advantageously prevents an abrasion of the print image. In this way, a higher grade of robustness is provided so that a greater applied quantity that otherwise reduces the abrasion resistance is possible, which makes it possible to present a larger color space.

Different materials providing a slippage thereby have different properties, and may be chosen adapted to the substrate 10 and the printing method used or the fluid used for printing. For example, if it is a wax emulsion, the applied wax droplets solidify on the surface and thus remain on the surface of the printed recording medium 1. By contrast, in the case of silicone droplets these partially penetrate into the substrate 10. Degree of gloss and impression of the printed recording medium 1 are thereby preferably maintained.

If applicable, only a partial application in a printed region 4 is also possible with the low-friction layer, in order to reduce consumable costs.

Figure 5:
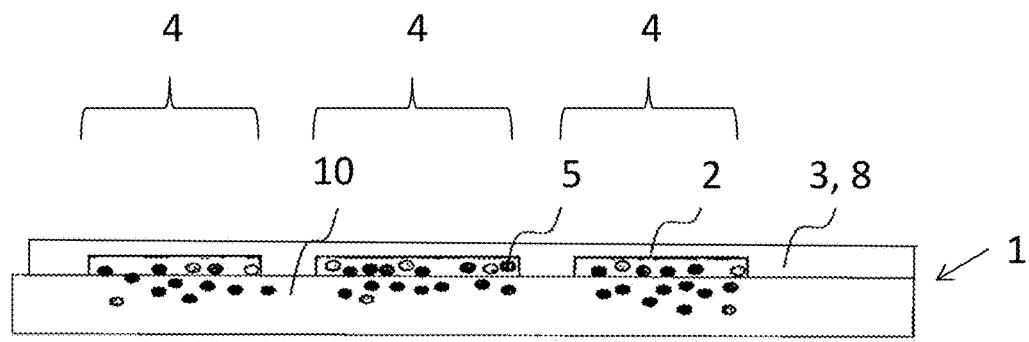
FIG. 5 is a schematic depiction of a printed recording medium according to an exemplary embodiment of the present disclosure.

FIG. 5 shows a schematic depiction of an exemplary embodiment of a printed recording medium according to a further embodiment.

In this exemplary embodiment, the surface protection 3 is designed as a continuous, sealed, cured varnish layer 8 which extends over nearly the entire width of the substrate 10, across multiple printed regions 4. In further embodiments, however, the varnish layer may also be provided only in the printed regions 4 in order to reduce the varnish consumption.

The colorant layer or pigment layer 2 printed here is, as an example, designed as an ink printed via inkjet printing. Upon application of the surface protection 3, the areas printed with ink are completely covered by the varnish layer 8.

The varnish layer 8 has a strong connection to the substrate 10 and provides a high abrasion resistance. The varnish layer 8 thus increases the abrasion resistance of the surface of the printed recording medium 1 and thus serves as a mechanical protection of the printed good. In this way, the ink does not need to be completely dried out for further processing, such that a higher applied quantity of ink per area is possible, which produces a greater presentable color space.

The application of the varnish layer 8 is performed during the printing process, immediately after the ink application, possibly after a pre-drying of the ink. A pre-drying of the ink is advantageous since possible reactions between ink and varnish are thus precluded.

The coating is cured directly after the application. Upon application of the varnish layer 8, fluid components 5 such as moisture and solvent accordingly remain present in the ink and/or in the substrate 10.

Among other things, ultraviolet (UV)-curable varnishes, dispersion varnishes, latex-based varnishes or infrared (IR)-curable varnishes are usable for the varnish layer 8. The varnish layer may be applied with, among other things, a print head row, via spray application, via roller application, with a raster roller system (flexo-coating unit), or with a scoop roller system, for example.

FIG. 6 shows a schematic depiction of an exemplary embodiment of a printed recording medium according to yet another exemplary embodiment.

The surface protection 3 here is designed as a low-friction layer 9. This is provided as an emulsion and may in particular contain wax, latex or silicone. It is preferably droplets 6 containing wax, latex or silicone. According to this embodiment, a sealed coating is thus not necessary. In this way, evaporation of printed fluid components 5—for example water or solvent—is thus possible.

The application of a low-friction layer 9 is likewise performed during the printing process, for example immediately after the ink application or possibly after a pre-drying of the ink in inkjet printing. However, a pre-drying of the ink is also advantageous here since possible reactions between ink and the emulsion are thus precluded. A print head row, a spray application, a roller application, a raster roller system (flexo-coating unit), or a scoop roller system may likewise be provided for application of the low-friction layer 9, as an example.

Due to the low coefficient of friction of the surface that is provided with the low-friction layer 9, damaging of the print image is prevented, for example upon rolling and belting in transport of the recording medium or upon a stacking, rolling up or handling of the same. Friction properties of the printed good thus may be adapted as necessary and possibly locally, in particular independently of the substrate 10 used and the printing method used or the fluid or ink used. The applied quantity per area that is provided for an increased color space thus remains undamaged.

In the depicted embodiment, the low-friction layer 9 is applied liberally across the printed regions 4. Insofar as the low-friction layer 9 is only applied partially in the printed regions 4 of the recording medium 1, however, the consumption of emulsion—and thus the consumables costs—may be reduced.

FIG. 7 shows a schematic depiction of an exemplary embodiment of a printed recording medium according to a further exemplary embodiment.

In this exemplary embodiment, the surface protection 3 has a plurality of individually cured varnish droplets 7 provided as separating elements. A sealed coating is not necessary here, such that an evaluation of printed fluid components 5 is possible, for example water or solvent from a printed ink.

The varnish droplets 7 are preferably configured such that they do not affect the degree of gloss and/or the impression of the printed recording medium. They are preferably provided so as to be transparent in this regard. A size of the individual varnish droplets is also preferably provided in the micrometer range, for example with a diameter of 10 µm to 50 µm.

A high number of such varnish droplets is preferably provided, uniformly distributed, in the printed regions 4. For example, a relative areal coverage of the printed regions 4 by the varnish droplets 7 of 0.5% to 10% is thereby achieved overall.

For this the varnish is applied inline, meaning during the print job, possibly after a pre-drying of the print colors, in fine droplets 7 onto the printed substrate surface and is cured, for example by means of UV lamps. The cured droplets 7 thus form mechanical spacers which establish a separation with regard to abrasion-causing elements such as rollers or belts for transport of the recording medium, or with regard to elements provided in stacking, rolling or handling of the recording medium, and thus increase the abrasion resistance of the surface of the printed recording medium.

Such a coating with cured droplets 7 may, among other things, be applied via an additional print head row or an additional print bar of a printing system. Moreover, the droplets 7 may also be applied by means of spray application or with a raster roller system.

In the depicted embodiment, the surface protection 3 formed with cured droplets 7 is provided only partially in the printed regions 4. For example, the depicted embodiment may be a recording medium 1 printed to by means of inkjet printing, in which the droplets 7 are provided only in the segments 4 of the recording medium 1 that are printed to with ink, onto the ink and/or the substrate 1. In this way, the friction properties of the printed good may be adapted to the local conditions or the local requirement, here the locally reduced abrasion resistance of the ink. This is advantageously possible independently of the type of substrate 10. Furthermore, this is also possible independently of the ink 2 that is used. An increased abrasion resistance may thus be provided, which enables a greater applied quantity and thus a greater color space.

In further embodiments, however, the droplets 7 may also naturally be applied over the entire area of the recording medium. In this way, a more homogeneous surface of the entire recording medium is provided.

FIG. 8 shows a schematic depiction of a development of the exemplary embodiment of a printed recording medium according to FIG. 5.

In contrast to the exemplary embodiment according to FIG. 5, here it is not a sealed varnish layer but rather a porous varnish layer 11 that is provided. This allows fluid components 5 to migrate through the varnish layer 11 to the surface. Furthermore, humidity may thus also penetrate through the varnish layer 11 into the colorant layer or pigment layer 2 and into the substrate 10.

Figure 9:
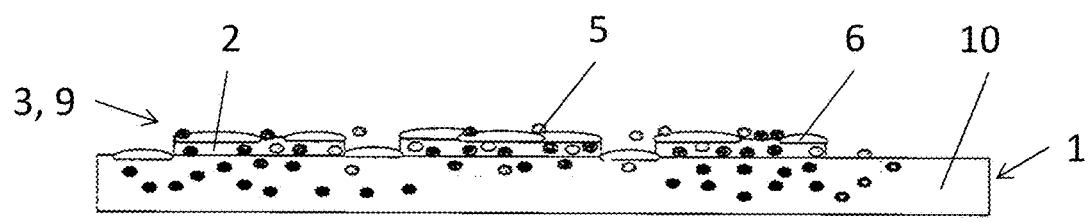
FIG. 9 is a schematic depiction of a printed recording medium according to FIG. 6.

FIG. 9 shows a schematic depiction of a development of the exemplary embodiment of a printed recording medium according to FIG. 6.

In comparison to the exemplary embodiment according to FIG. 6, this exemplary embodiment involves already partially dried or solidified droplets 6 of an emulsion applied as a low-friction layer 9.

For example, after a certain duration wax droplets of the emulsion have lost their fluid fractions and solidify on the surface of the printed good or of the printed recording medium 1.

In the case of silicone droplets which may have certain creep properties, after a certain duration these have penetrated partially into the substrate 10, for example. For example, these may be a mineral oil-based silicone whose properties are matched to the substrate used.

Furthermore, due to the droplet-like distribution of the emulsion, printed fluid components 5—for example solvents of an ink—may have partially migrated to the surface. Moreover, the fluid components 5 may also have partially migrated into the substrate 10.

Figure 10:
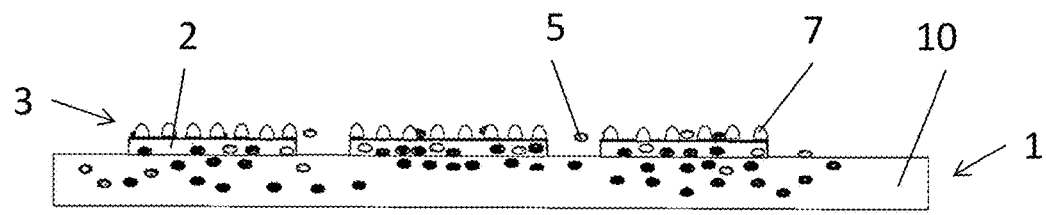
FIG. 10 is a schematic depiction of a printed recording medium according to FIG. 7.

FIG. 10 shows a schematic depiction of a development of the exemplary embodiment of a printed recording medium according to FIG. 7.

In particular, it is thereby a recording medium 1 that has aged for longer after the application of the surface protection (3), in which printed fluid components 5 of the ink 2 have migrated in part into the substrate 10 and in part to the surface.

Although the present disclosure has been described in the preceding entirely using preferred exemplary embodiments, it is not limited to these, but rather can by modified in diverse ways.

In particular, instead of a printing by means of inkjet printing, a different method for printing by means of fluid-based colorant transport or pigment transport may be used in all exemplary embodiments.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 printing system
2 colorant layer or pigment layer
3 surface protection
4 printed region
5 fluid components
6 droplets
7 droplets or varnish droplets
8 sealed layer or varnish layer
9 low-friction layer
10 substrate
11 porous layer or varnish layer
S1-S4 steps

The invention claimed is:

1. A method for printing to a recording medium using a fluid-based colorant transport or pigment transport, comprising:
    fluid-based printing to the recording medium with an applied quantity per area to provide an increased color space; and
    applying a porous surface protection to the recording medium, the porous surface protection being configured to:
        increase abrasion resistance in at least a printed region of the recording medium, and
        allow fluid components of the fluid-based colorant transport or fluid components of the pigment transport to migrate through the porous surface protection and/or allow humidity to penetrate through the porous surface protection into the fluid-based colorant transport or pigment transport.

2. The method according to claim 1, further comprising:
    a drying operation after the printing and before the application of the porous surface protection, the drying operation including at least a pre-drying of printed fluid components.

3. The method according to claim 2, wherein the printed applied quantity per area is increased in relation to parameters of the drying operation such that the printed fluid components are incompletely dried upon application of the porous surface protection.

4. The method according to claim 1, wherein the porous surface protection is applied continuously over the printed region.

5. The method according to claim 4, wherein the porous surface protection is applied fully over the entire area of the recording medium or partially in only a printed region of the recording medium.

6. The method according to claim 1, wherein the porous surface protection is applied discontinuously.

7. The method according to claim 6, wherein the porous surface protection is applied discontinuously is a form of individual droplets.

8. The method according to claim 1, further comprising curing the porous surface protection directly after the application of the porous surface protection.

9. The method according to claim 1, wherein the porous surface protection is a varnish including a UV-curable varnish, dispersion varnish, latex-based varnish and/or IR-curable varnish.

10. The method according to claim 9, wherein the varnish comprises an ultraviolet (UV)-curable varnish, a dispersion varnish, a latex-based varnish or an infrared (IR)-curable varnish.

11. The method according to claim 1, wherein the porous surface protection is applied as a low-friction layer to reduce a surface coefficient of friction of the printed recording medium.

12. The method according to claim 11, wherein the low-friction layer is an emulsion containing silicone, wax or latex.

13. The method according to claim 1, wherein the porous surface protection is configured to increase an abrasion resistance given an applied quantity per area to increase the presentable color space.

14. A non-transitory computer-readable storage medium with an executable program stored thereon, when executed, causes a processor to perform the method of claim 1.

* * * * *